United States Patent [19]

Hölter et al.

[11] Patent Number: 4,733,605
[45] Date of Patent: Mar. 29, 1988

[54] PROCESS AND DEVICE FOR PURIFYING POLLUTED AIR

[75] Inventors: Heinz Hölter, Reisenstrasse 39 - 41, 4390 Gladbeck; Heinrich Igelbüscher, Gladbeck; Heinrich Gresch, Dortmund; Heribert Dewert, Gladbeck, all of Fed. Rep. of Germany

[73] Assignee: Heinz Holter, Gladbeck, Fed. Rep. of Germany

[21] Appl. No.: 752,179

[22] PCT Filed: Sep. 18, 1984

[86] PCT No.: PCT/EP84/00286
§ 371 Date: Jun. 11, 1985
§ 102(e) Date: Jun. 11, 1985

[87] PCT Pub. No.: WO85/01704
PCT Pub. Date: Apr. 25, 1985

[30] Foreign Application Priority Data

| Oct. 11, 1983 | [DE] | Fed. Rep. of Germany | 3336903 |
| Nov. 10, 1983 | [DE] | Fed. Rep. of Germany | 3340667 |
| Nov. 29, 1983 | [DE] | Fed. Rep. of Germany | 3343128 |
| Feb. 24, 1984 | [DE] | Fed. Rep. of Germany | 3406709 |
| Jun. 20, 1984 | [DE] | Fed. Rep. of Germany | 3423848 |
| Jun. 28, 1984 | [DE] | Fed. Rep. of Germany | 3422778 |
| Aug. 25, 1984 | [DE] | Fed. Rep. of Germany | 3431373 |
| Aug. 25, 1984 | [DE] | Fed. Rep. of Germany | 3431372 |

[51] Int. Cl.⁴ ............................................. B60H 3/06
[52] U.S. Cl. ................................................. 98/2.11
[58] Field of Search ............................... 98/2.01, 2.11

[56] References Cited

U.S. PATENT DOCUMENTS 4,352,321  10/1982  Fukui et al. ........................ 98/2.11
4,530,817   7/1985  Hölter et al. ................... 422/171 X Primary Examiner—Harold Joyce
Attorney, Agent, or Firm—Karl F. Ross; Herbert Dubno; Ronald Lianides

[57] ABSTRACT

A chemisorption filter is provided for receiving contaminated air to be filtered and partially heating the air while filtering same, with a further heater downstream of the chemisorption filter for further heating the air. A catalyst mass is traversed by the air heated by the heater and disposed downstream of the heater for further purifying the air, with further device downstream of the catalyst mass for cooling the air upon passage thereof through the catalyst mass, all of the devices collectively forming an air purifier to a passenger compartment of an automobile for supplying the compartment with purified air. A sensor is provided behind the radiator of the automobile and contacted by the air displaced therethrough by a fan, the sensor detecting contaminant levels in the external air before it is admitted to the chemisorption filter, for controlling the on/off operation of the air purifier.

19 Claims, 14 Drawing Figures

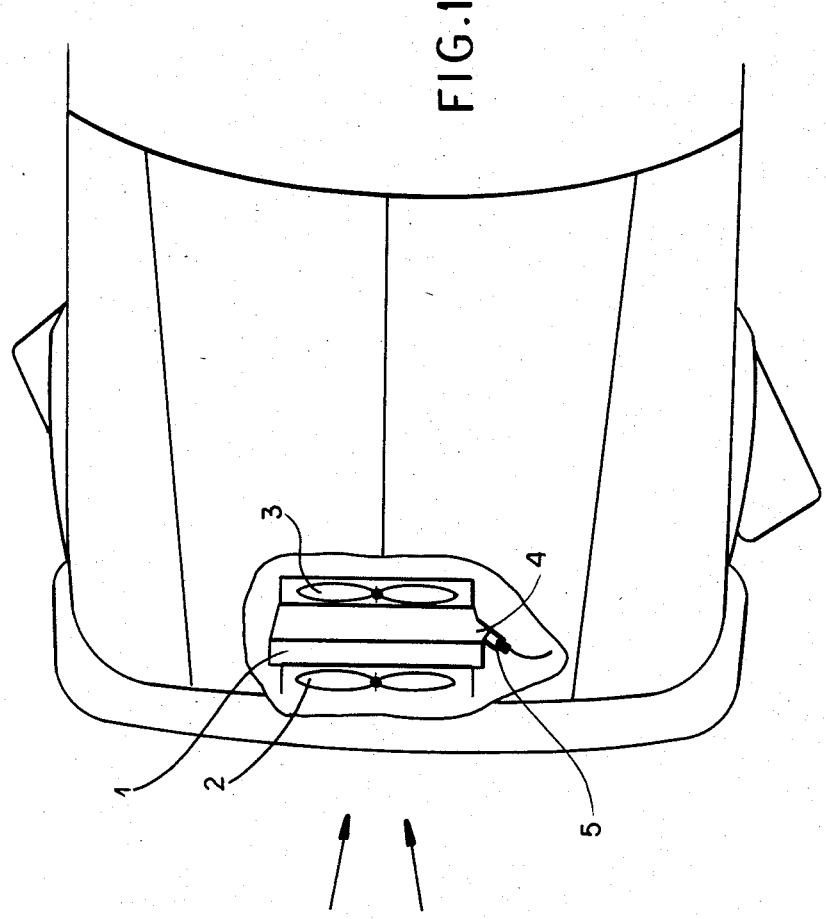

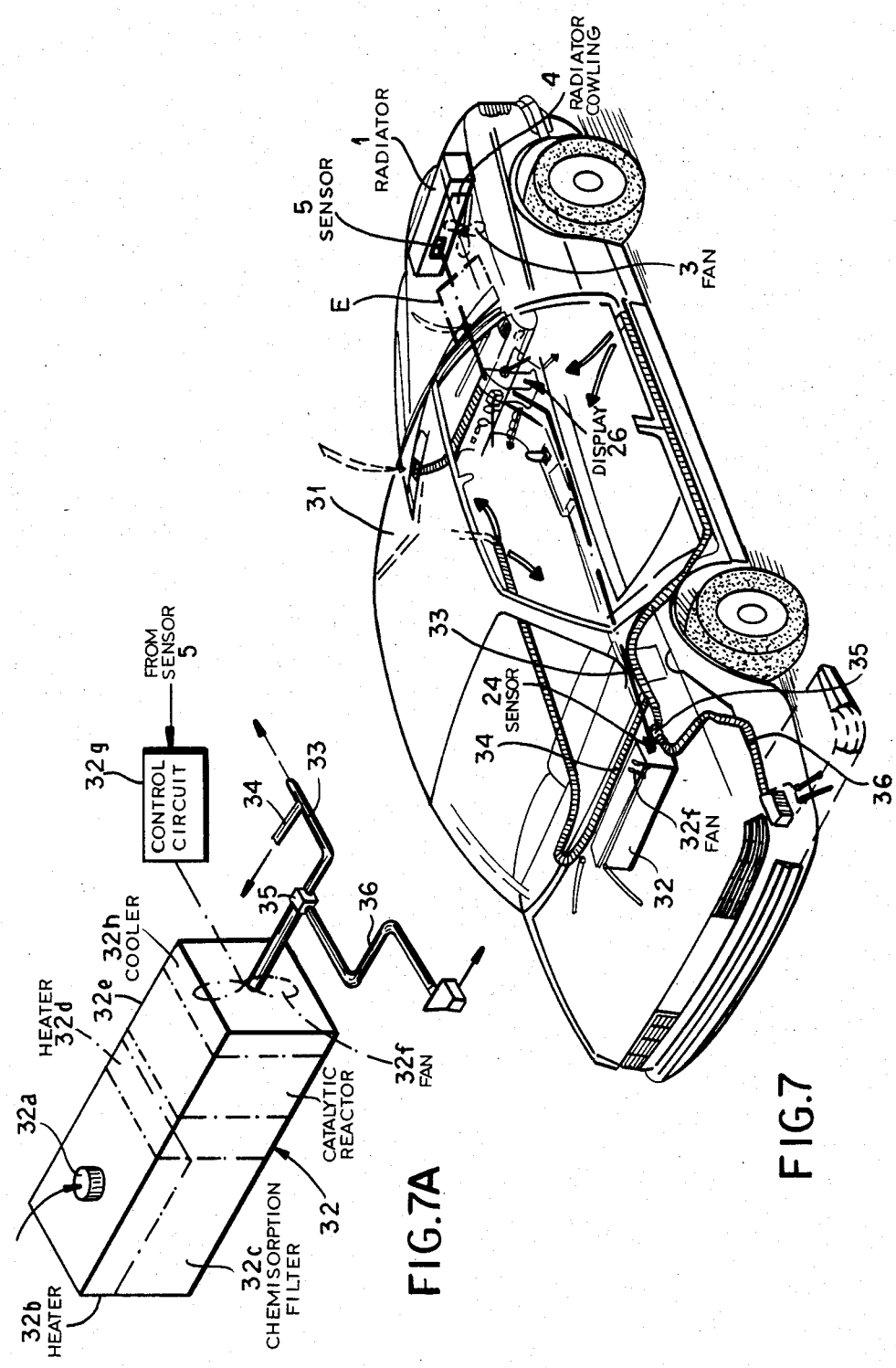

PROCESS AND DEVICE FOR PURIFYING POLLUTED AIR

CROSS REFERENCE TO RELATED APPLICATIONS

This application is a national phase application corresponding to PCT EP 84/00286 filed 18 Sept. 1984 and based upon the following national applications in the Federal Republic of Germany:

P 333 6903.8 filed 11 Oct. 1983;
P 334 0667.7 filed 10 Nov. 1983;
P 334 3128.0 filed 29 Nov. 1983;
P 340 6709.4 filed 24 Feb. 1984;
P 342 3848.4 filed 20 June 1984;
P 342 2778.4 filed 28 June 1984;
P 343 1373.7 filed 25 Aug. 1984; and
P 343 1372.9 filed 25 Aug. 1984 under the International Convention.

FIELD OF THE INVENTION

The present invention relates to a process and a device for purifying air that contains toxic matter. The air being supplied to compartments or the like that are used by personnel, for example, motor vehicle cabs, such devices incorporating a chemisorption filter and a catalytic mass downstream of the chemisorption filter in the direction of flow of the air, the air that is to be purified being subjected to partial heating prior to entering the chemisorption filter and being subjected to further heating prior to entering the catalyst, the air being subsequently cooled and then supplied to the cab or the like.

BACKGROUND OF THE INVENTION

Recently, many attempts have been made to remove toxic agents from air by using filtration systems, so that the air thus purified can be supplied to the vehicle operator or to the operator's compartment.

Up to now, as a rule, the filtration system has been controlled based on the hydrocarbons odor.

Repeated attempts have been made to control the switching on and off by means of measuring devices according to the load of toxic substances.

The installation of measuring systems with simultaneous evaluation is extremely costly and is considered to be scarcely practicable for economic reasons.

On the other hand, sensors that in each instance display a specific level of sensitivity for a specific toxic component can be used as indicating devices.

However, the development of measuring devices or sensors so as to obtain reliable readings is extremely difficult.

If one is to install a measurement and control system within a motor vehicle and thus ensure that the applied air is always filtered if the indicators in the vehicle indicate toxic agents, the air that is supplied to the vehicle interior through the filter would soon indicate a positive value relative to its degree of purity, and the filter system would be switched off.

If, however, the outside air contains toxic agents, after a period of for instance one or two minutes the measuring devices would respond and indicate the presence of such agents.

This is to say, that there would have to be constant switching on and off, with the appropriate delay phases without any guarantee that a continuous supply of air is ensured when toxic substances can become a nuisance in the area outside the vehicle.

For this reason, the measurement systems are installed outside a vehicle.

Considerable difficulties are encountered when this is done; for example, in fog, frost, sunshine following frost, or heavy rain the measuring probes or the sensors are prevented from providing accurate readings because of a large number of adversely-effective environmental influences.

The installation of measuring devices with pre-drying based on gel filters, as an example, or the incorporation of measuring apparatuses in the air-aspiration ducts for the supply of air in the air-conditioning shaft or the normal fresh-air shaft is subjected to the constant changes in humidity and constant temperature variations and in addition to this, when the vehicle is in heavy traffic there is an efflux of gases from the area of the engine, repeatedly in the case of motorcars and trucks, these gases having a content of toxic substances that is not usual as a triggering value for a CO or hydrocarbon sensor but which, on the other hand, will falsify the picture by virtue of the cross-sensitivity of all measurement systems.

OBJECT OF THE INVENTION

It is an object of the present invention to provide a system of the type described with suitable measuring probes or sensors installed in the vehicle in a location that is found to be neutral, preferably in a motorcar.

SUMMARY OF THE INVENTION

It was found that the most neutral location for the indicator of a sensor or measurement device was directly behind the radiator, which is to say in an area of the airwashed space where the fan, even when the vehicle is stationary, will draw air through the heat exchanger formed by the radiator during an appropriate temperature increase and the measurement device—regardless of what kind—is airwashed at an almost constant temperature, for it is known that cooling system radiators operate, as a rule, at approximately 90° C. so that the air that is passed to the primary detector is not only free of flies, insects, and the like, which is always a hazard when measuring devices are set up in a current of air, but is also free of coarse dust, and the air that flows is at an almost constant temperature in both summer and winter as it is passed to the measuring device.

According to the present invention, the sensor is so located that it is acted upon by a tangential air flow; this means, that fine particles of dust do not build up on the sensor, for example, but pass by at a tangent with the air, and thus cause no alteration of the measurements that are obtained.

It is known that the operator of the vehicle is informed of the presence of toxic substances by way of toxic-agent sensors and by means of acoustic and/or visual signals, such as a luminous diode. A chemisorption filter is connected to the sensor and this ensures that the aspired air, charged with toxic substances, which is to be passed, possibly under pressure, to ventilate the passenger compartment, has been purified.

However, at the present time there is no technology that can ensure that it is possible to recognize the fact that the chemisorption filter is full, and thus prevent the passengers being affected by toxic desorption of the filter.

For this reason, the present invention provides that an additional sensor is incorporated at the exhaust end of the chemisorption filter and that this informs the operator either directly, by means of a second luminous diode when the filter is used up, i.e. when desorption is taking place, or, the luminous diode being switchable, which is to say can be switched from the outer sensor to the inner sensor of the filter, thus making it possible to ascertain whether or not desorption has already started or whether the filter is still dully operational.

By way of example, it is known that the sick-days rate, particularly among bus drivers, is very high and colds are the frequent cause.

In many modern city buses the operator must not only operate the vehicle, but must also issue tickets.

This means that the operator is frequently in contact with exhaled air that contains pathogens.

The operator is well protected against drafts caused by frequent opening of the bus doors by means of protective glass screens.

It is known that the operator can be enclosed by air curtains in an air-conditioned operator's compartment in order to protect him as far as possible against injurious extraneous effects.

In addition, it is known that the injurious toxic substances with which the air is charged in traffic, can be kept away from the operator by means of chemisorption-type filters.

To a very great extent, such chemisorption filters remove hydrocarbon compounds and acid components from the air and can, if so desired, break down the fatigue producing CO content.

Thus, carcinogenic and fatiguing toxic agents can be kept from the operator; however, up to now no adequate measure to provide protection against the repeated bacteriological contamination of breathable air that is caused by new passengers constantly entering the vehicle have been developed.

Thus, in addition to having to perform his work, which requires a high level of concentration, the operator is exposed to a double hazard in the form of the concentration of toxic agents in the air that is supplied to his compartment from the street and the simultaneous contamination of breathable air, which is caused by the passengers themselves.

In order to eliminate the respiration hazard caused by pathogens, the present invention provides that the operators of municipal buses that service densely populated districts be supplied with respiratory air through a filter that comprises a prefiltering device constructed as a chemisorption unit and a subsequent filter to remove pathogens.

It is known that in a city, considerable concentrations of toxic agents can occur within motor vehicles. It is also known that very often the fan is switched on so as to augment the movement of air in a passenger vehicle when such a vehicle is moving slowly. This can mean that very frequently in stop and go traffic, and particularly when the vehicle is at a standstill, considerable quantities of toxic agents can be forced into the vehicle interior, regardless of the status of the outside atmosphere.

For this reason, the present invention provides that the vehicle ventilating fan be controlled automatically so that when the air is contaminated by toxic agents the ventilating fan is switched off automatically, the health hazard to the occupants being reduced thereby, the ventilating fan being switched on once again when the level of contamination falls, this point being selected and set by the operator.

This simple measure reduces the level of toxic agents in the vehicle interior.

It is also known that vehicle ventilation systems can be closed or opened by means of sensor-activated control elements.

At the present time, it is customary to use semiconductor sensors.

The operating range of narrow-band sensors does not fall within the toxic-agent concentrations that occur in traffic, but normally falls in a range that is one order of magnitude above this.

Thus, for example, the response sensitivity of conventional stannic oxide sensors used to detect CO is 50 ppm, whereas in traffic, concentrations of 1 ppm must be detected.

Other injurious substances occur at correspondingly lower concentrations.

In order to realize the basic concept of the present invention—to provide reliable detection of concentrations of toxic substances in traffic—it is thus necessary to provide stable sensing characteristics in the response range of less than 1 ppm by means of special circuitry. In these lower concentration ranges the sensors display no linearity in their behavior, but climb towards very high resistance values, so that no adequately stable control can be ensured and unstable control can result in this exponential area.

The indications provided by sensors are also temperature-dependent.

When they are used at the place of installation, particularly as sensors for toxic agents in an automobile, to detect airborne contamination, they are exposed to very large temperature variations caused by the weather and also resulting from flow conditions.

At the same time, heat is generated by the sensors themselves as they warm up.

Thus, a stable reading can only be expected if the sensor element is kept at a constant temperature under all the conditions set out above.

The usual temperature-compensation measures arranged within a sensor control system are not successful since influences effective at this point cannot be detected directly by the sensor transistor.

Thus, the present invention provides that the primary-detector element used to determine the sensor temperature be mounted directly on the sensor itself so that both the temperature of the sensor and the heat that is transferred to this location by convection can both be determined.

Furthermore, according to the present invention the sensor heat output is controlled by this primary detector so that, according to the present invention, a constant sensor temperature (reaction temperature for the sensor) is achieved.

In addition, under the terms of the present invention, the decontamination that results from sensor heating takes place at a constant temperature, i.e., the response rate of the sensor remains constant.

It has already been proposed that for purposes of switching the fresh-air flow for operators' compartments or work-protection cabins a sensor be used which controls the fresh-air ventilator fan when toxic agents are present, so that air exchange in the driver's compartment is only guaranteed if clean outside air acts positively on the sensor, i.e., the sensor switches the ventilator fan on.

Furthermore, according to the present invention it is also proposed that simultaneously with smog measurement
(a) the sliding roof
(b) the door windows—controlled by sensor—are closed and
(c) if desired, an acoustic tone or bell signals the process so that all openings are to be closed.

BRIEF DESCRIPTION OF THE DRAWING

Exemplary versions of the present invention are illustrated in the drawing appended hereto. In the drawing:

FIG. 1 is a top view in diagrammatic form of the front part of a motor vehicle, partly broken away;

FIGS. 7 and 7a are a perspective illustration of a motor vehicle diagrammatically showing the duct layout;

FIG. 7A is a perspective detail of a part of FIG. 7;

SPECIFIC DESCRIPTION

The invention is shown in FIG. 1, wherein 1 is the cooling system radiator, 2 a fan that is incorporated in front of the radiator 1, and 3 a fan that, if desired, can be installed behind the radiator in the direction of flow of drawn-in air, as indicated by the arrows; 5 indicates the primary element, e.g. sensor, installed obliquely in the radiator cowl 4 so that the air flows tangentially over the sensor and passes away from the sensor with any fine dust particles that it is carrying.

It is known that the air that is drawn in can be heated prior to passing through the chemisorption filter and then cooled once it has passed through the chemisorption mass so that it can be used as breathable air at a suitable temperature.

In order to supply this heating and cooling to the air stream, a plurality of Peltier elements are used in the air purifier, forming a thermoelectric converter having the required number of cooling surfaces on the warm and on the cold side.

Figure 3:
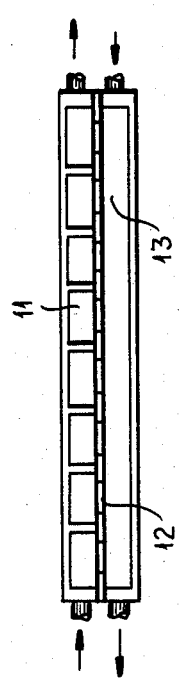
FIG. 3 is a sectional side view of the assembly of FIG. 2 with heat exchanger plates divided into several sections.
Figure 4:
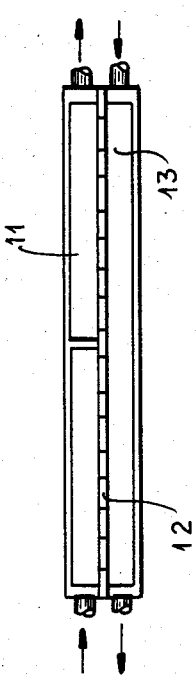
FIG. 4 is a sectional side view of the assembly of FIG. 2 with a two-fold subdivided heat-exchanger plate.
Figure 2:
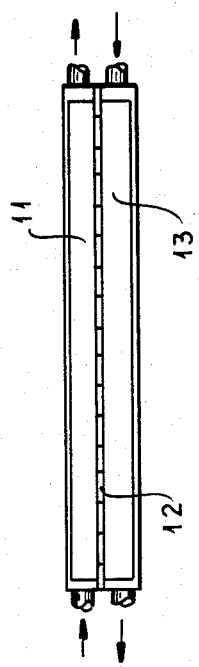
FIG. 2 is a sectional side view of a battery of Peltier elements.

Such Peltier, converters are illustrated in FIGS. 2, 3, and 4.

In FIG. 2, 11 indicates the heat-exchanger plates to be warmed, 12 indicates the individual Peltier elements and 13 indicates the lower heat-exchanger plates of the Peltier converters, the so-called cool side, in contrast to the upper hot side, 11.

In FIGS. 3 and 4, the Peltier converter is illustrated as it is in FIG. 2, in which regard and according to the present invention the upper hot plate 11, also called a heat-exchanger element, is divided transversely into equal sections with a gap of one or more millimeters between them. The lower plate 13 is undivided.

It is known that, for example, elements of heat exchangers made of aluminum are frequently used in Peltier converters since they are very light and display good thermal transfer characteristics, although they expand a great deal, starting for example, between 50° and 60° C.

This results in the fact that the cold plate 13 exhibits a considerable contraction in the operating area in contrast to the warm plate 11, and this leads to constant and undesirable shifting in relation to the installed Peltier elements, which means that the reliability of this type of heat exchanger is not always guaranteed because of the unavoidable wear that takes place at the transition points.

In order to avoid this shifting, according to the present invention it be proposed that the cold plate 13 is continuous and the hot plate 11 be divided or subdivided in several places so that shifts between the warm heat-exchanger plates and the Peltier elements are reduced to a minimum.

According to the present invention, in the case of great lengths, the warm side can be divided into portions of different lengths so that longitudinal expansion for the upper sub-elements is in each instance kept to a minimum for the particular transfer range of the proportionate Peltier elements involved.

It is, of course, to be understood that the present invention is not restricted to the embodiments that have been described and illustrated in detail above, but that numerous variations are possible without, however, deviating from the basic concept of using the Peltier converter, preferably for heating and cooling chemisorption masses used for work-protection and automobile filters, in a structure with heat-exchanger plates having Peltier elements and being divided, preferably into several parts on one side, so that although they form one unit with the cold side it is possible for longitudinal expansion to take place on the warm side.

Nevertheless, the building-block concept is maintained by the differentiated division of the heat-exchanger plate 11.

Figure 6:
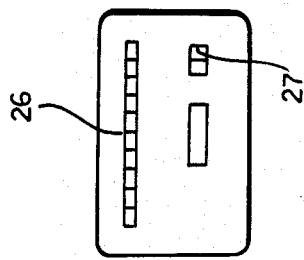
FIG. 6 is an elevational view of a central indicator device.
Figure 5:
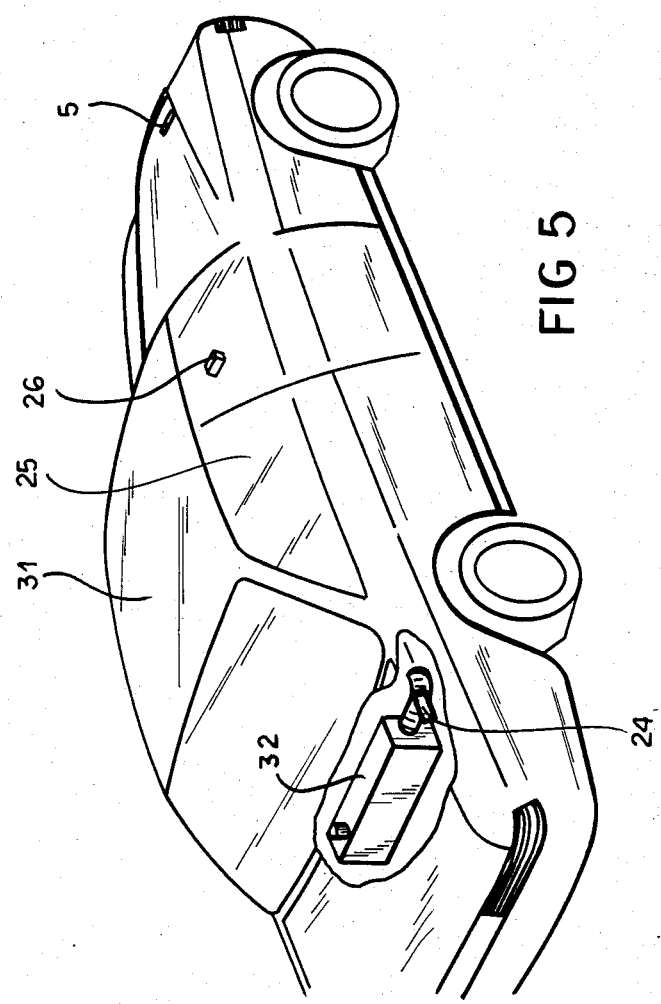
FIG. 5 is a perspective rear view of a motor vehicle, partly broken away.

In FIGS. 5 and 6 the device used to switch on and monitor the chemisorption filter of the air purifier 32 is shown.

In FIG. 5, an automobile 31 is provided with an automobile filter unit or air purifier 32; 5 indicates the front sensor; beneath the hood and 24 indicates the rear sensor in the area of the exhaust connector of the chemisorption filter unit, preferably before the entrance of the purified air into the air duct that passes into the cab 25. In FIG. 6, the central indicator 26 is connected to the front and rear sensors 5 and 24, and a changeover switch 27 for the central indicator is connected to the front and rear sensors and switchable therebetween for monitoring either sensor.

It has already been proposed that a chemisorption filter used to purify the respiratory air for the vehicle cab be so configured that if desorption from the chemically adsorbent mass takes place the ventilator fan in the cab will be automatically switched on so that the air will be driven to the outside atmosphere from the cab, counter to the desorption.

Further to this, the present invention proposes that the same effect can be achieved if the ventilator fan continues to operate in the same direction, although deflectors after the filter are set so that the air cannot be passed back to the passenger compartment, but is fed to the vehicle trunk or to the open air.

In FIG. 7, the passenger vehicle 31 is provided with a chemisorption filter air-purifier unit 32 feeding via switching valve 35 into the air supply ducts 33 and 34 and into the vehicle cab 25, or into a desorption duct 36 that vents either the trunk or outside the vehicle.

As mentioned previously (see FIGS. 7 and 7A), the filter unit 32 or air purifier can have an air intake 32a which leads the external air into an initial heater 32b, e.g. formed by the Peltier converter described in connection with FIGS. 2-4, the air then passing into a chemisorption filter 32c proper. A further heater 32d downstream of the chemisorption filter 32c reheats the air before it reaches the catalytic mass in the catalytic reactor stage 32e of the air purifier and a fan 32f seen in FIGS. 7 and 7A, can be used to operate the air purifier in response to a control circuit 32g. The control circuit 32g, of course ultimately receives its input from the sensor 5 which is located behind the vehicle radiator 1 in the cowling 4 receiving the fan 3 which is driven by the engine E, shown in highly diagrammatic form in FIG. 7. For the precise position of the sensor 5 vis-á-vis the cowling 4, reference may be had to FIG. 1 and the description in conjunction therewith. As described in connection with FIG. 5, the sensor 24 measures breakthrough of contaminated air through the air purifier and is disposed at the outlet thereof and connected to valve 35 to allow the valve 35 to operate to discharge the air through the duct 36, as shown in FIG. 7, to the exterior of the vehicle. The sensor 24 and the sensor 5 can both be connected to the display 26 on the dashboard of the vehicle as has also been described.

The whole circuit 32g can be automated by sensor 5 which provides an indication of the toxic-substance content and controls the fan 32f.

Figure 8:
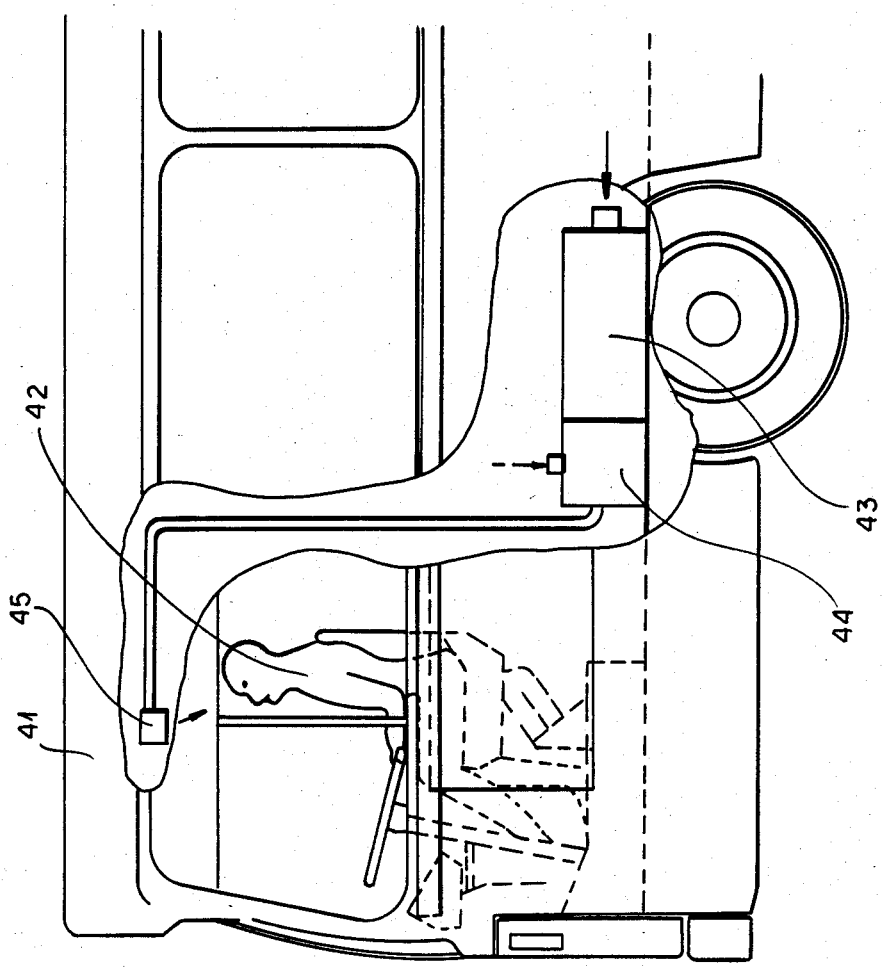
FIG. 8 is a side view of the front portion of a bus, partly broken away.

In FIG. 8, a bus 41 has a driver 42 and a chemisorption filter 43 that is installed behind the driver's seat; 44 is the subsequently incorporated filter cell 44 that removes pathogens. The ventilation nozzles above the driver 42 are numbered 45.

Further, according to the present invention, this combined chemisorption filter and pathogen filter is so switched that in city operation the chemisorption packet is activated through sensor control if toxic substances resulting from road traffic are present and the pathogen filter supplies air directly to the interior of the vehicle, without the chemisorption filter, or coupled through an air conditioner supplying healthy respiratory air to the operator.

This combined chemisorption-pathogen breakdown filter can, of course, be used in other vehicles (trucks and passenger vehicles).

The present invention is, of course, not restricted to the versions described and illustrated herein; numerous variations are possible without, however, departing from the basic concept of producing a filter for ventilation—preferably for the operators of city buses—such that it consists of a chemisorption packet that preferably by sensor control purifies respiratory air that is contaminated by road traffic and is to be supplied to the driver/-passenger area, removing acid components, hydrocarbons and CO and dust particles, and then passes this pre-cleansed air to a subsequent filter to remove pathogens, the filter then supplying the twice-purified air to the driver, preferably through a nozzle-head arrangement, in which regard for vehicles that are not normally used solely in city traffic the air can be passed directly through a dust filter with a subsequent pathogen filter system.

Filters to remove pathogens are known in technology in which preferably, battery-powered UV tubes are used.

Figure 9:
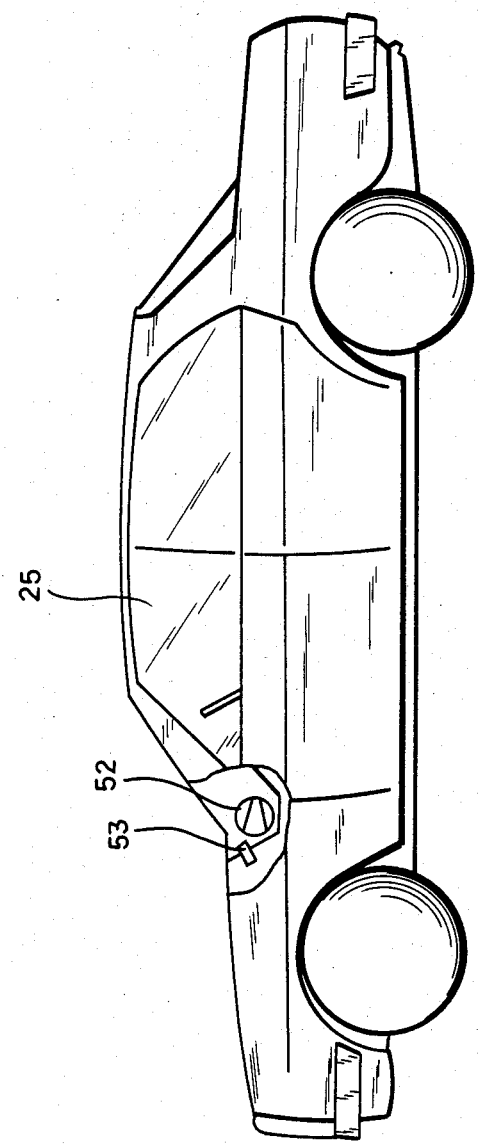
FIG. 9 is a side view of a motor vehicle, partly broken away.

In FIG. 9, the vehicle cab 25 is provided with a ventilator fan 52 controlled by a sensor 53 that is sensitive to toxic substances, this sensor switching the fan on and off.

The invention is not restricted, of course, to the versions described in detail above; numerous variations are possible without, however, departing from the underlying concept of controlling the vehicle ventilator fan automatically such that when the outside air contains toxic substances, the fan is switched off by the sensor that is sensitive to toxic substances and is acted upon by outside air, and switched on once again when the content of toxic substances is reduced, as selected by the driver.

Figure 10:
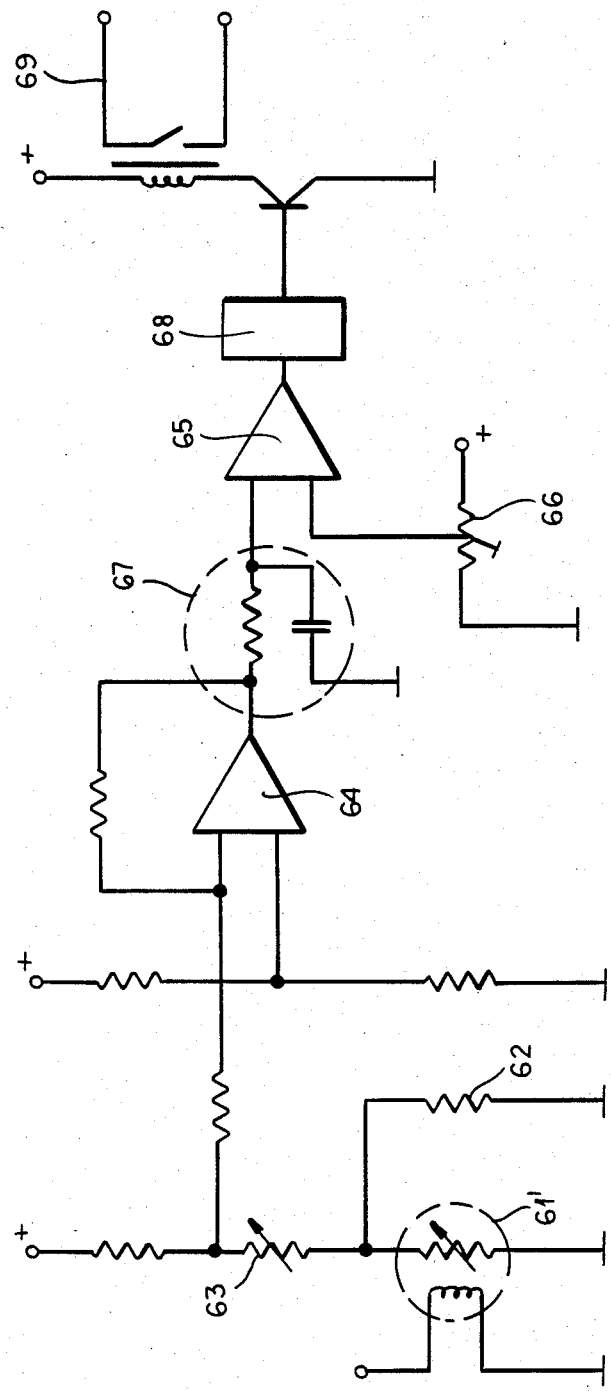
FIG. 10 is a control circuit diagram to avoid peaks when toxic agents are detected.

As shown in FIG. 10, the sensor 61 is bridged by a parallel resistor 62 in order to reduce the effect of the steep rise in resistance.

A further feature according to the present invention is represented by the temperature compensation of the sensors, such compensation being essential for automatic operation, since the sensor is of necessity exposed to varying climatological conditions when detecting external toxic substances.

The sensor has a negative temperature coefficient and corresponding in accordance with the present invention, in the leg of the bridge in FIG. 10—in series with the sensor—an equalizing PTC resistor 63 with a positive temperature coefficient is connected in series.

As a result of these two measures it is possible—with technical sensors which per se can only be used in higher concentration areas—to achieve stable operating behavior in the lower area of toxic-agent concentration that is to be detected in traffic.

The response sensor sensitivity that is reduced per se by using these two measures according to the present invention is compensated by a suitable subsequent relaxation amplifier 64.

In order to achieve proper operation of the control 69, two further and important conditions must be met:
1. A switching signal is to be initiated only when a specific threshold value is exceeded;
2. Very brief toxicity peaks that occur in traffic must be suppressed.

To this end, according to the present invention the amplified signal that is proportional to the toxic substances is passed to an adjustable, electrical switching circuit (comparator) 65 that generates a switching signal once a voltage chosen by a selector 66 is exceeded.

Further, according to the present invention an integrating low-pass filter 67 is incorporated between the amplifier and the comparator, allowing loads to pass only after a specific effect time and magnitude.

In order to avoid too frequent switching the control unit is provided with a timing element 68 that permits selection of a minimum switching duration.

Thus, constant switching on and off of the device caused by the surge-like and frequent loads that occur in traffic is avoided.

The detected quantities of toxic substances can further be passed analogously to an optical indicator, either through strips of luminous diodes or a digital indicator, according to choice.

The external arrangement of the sensors for the external detection of toxic substances means that the sensor is rapidly rendered inactive by an alien charge, and since it does not expel this rapidly enough as a result of the usual heating, it remains inactive.

In order to ensure that the response sensitivity is guaranteed at the highest availability wherever possible, according to the present invention it is proposed that each time the sensor is switched on its heating has an overvoltage applied to it in order to accelerate the expulsion of the alien molecules by the higher thermal output that is provided thereby.

According to the present invention this is achieved in that a zener diode is interposed in the mass branch stabilizer as one of the possible circuit variations. Of course, other elements that perform the same task can also be used.

Alternatively, an electronic building block can be provided such that each time the system is switched on or at set intervals, the electronic block drives the sensor heating at a high energy level for a specific length of time.

Figure 11:
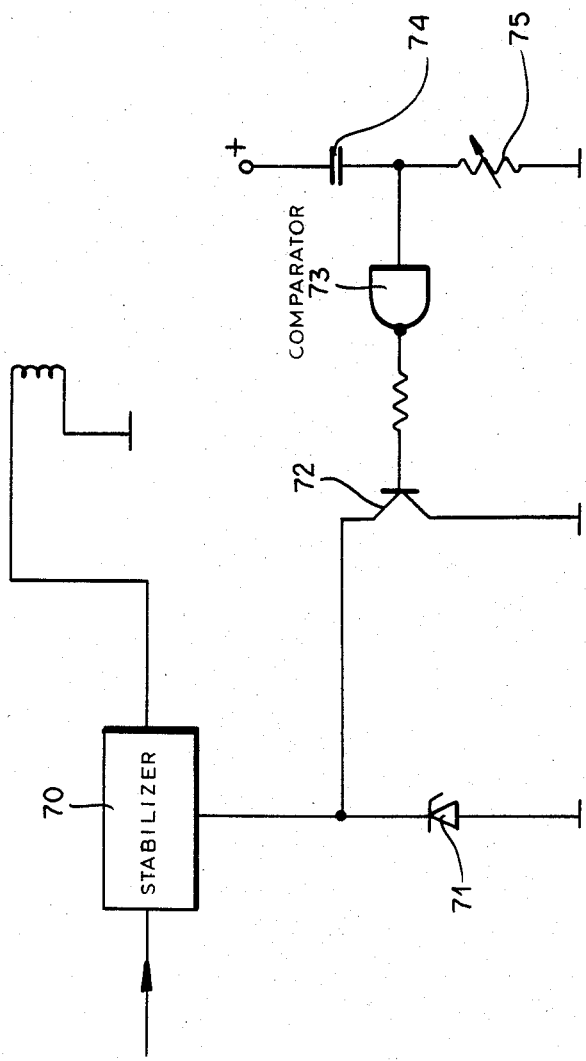
FIG. 11 is a diagram of a circuit to initiate a brief warm-up surge.

In a preferred embodiment as shown in FIG. 11, a circuit for resolving the brief warm-up surge that occurs at each power up is shown, in which a stabilizer 70 in its negative branch is grounded through a zener diode.

In normal operation the output voltages of the stabilizer would be increased by the turnover voltage. After a brief period a comparator 73 switches the transistor 72 through the RC element 74, so that the zener diode 71 is bridged. The output voltage of the stabilizer 70 reaches nominal value thereby.

The duration of the heating surge can be adjusted by means of the resistor 75.

Figure 12:
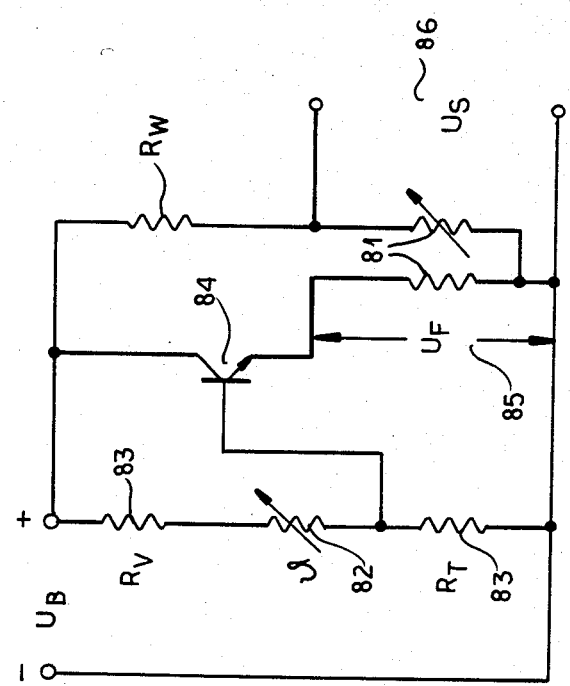
FIG. 12 is a diagram of a circuit to provide temperature-dependent sensor control.

Achievement of the present invention's concept of a constantly maintained temperature field in which the sensor operates, by controlling the heat output as well as compensation of the heat removal by alternating convection conditions is effected according to the present invention by means of a circuit as is illustrated in FIG. 12. Therein the sensor 81 is provided with a temperature resistance detector element 82 at the sensor, the voltage splitter resistances 83, and the transistor 84, preferably a Darlington transistor, in order to configure the necessary amplifier stage so that it is to a large extent independent of temperature.

The transistor output voltage $U_s$ that is generated thereby and is correspondingly proportional to temperature, heats the sensor.

Figure 13:
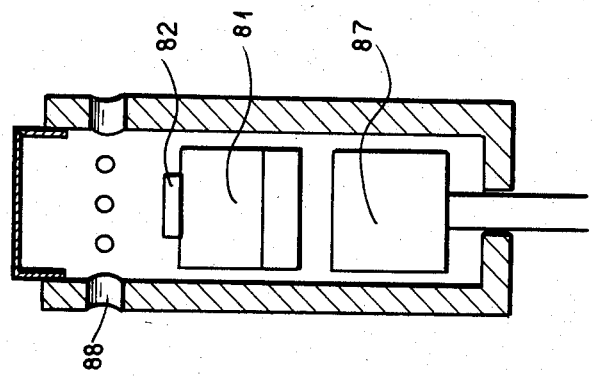
FIG. 13 is a sectional view of a housing with the circuit of FIG. 12.

FIG. 13 shows the sensor housing according to the present invention, this housing being used to accomodate the sensor and at the same time the sensor heating control stage that receives and processes the temperature and convection influences.

By the type of arrangement, this control stage constantly refers to the sensor temperature generated by the sensor heating system.

FIG. 13 shows the arrangement according to the present invention in a common housing. Therein 81 once again indicates the sensor, 82 indicates the temperature detector arranged on the sensor, 87 indicates the amplifier for controlling the sensor heating voltage 85, and 88 indicates the perforation in the housing to permit ingress of the toxic gases that are to be measured.

Up to the present it has been known to compensate the temperature effects through temperature detector elements in the control system, wherein in the event of temperature oscillations, the amplification factor of the amplifier is controlled.

In contrast to this, the temperature is kept constant by controlling the sensor heat voltage directly at the sensor.

This is better, and entails the added advantage that an even temperature occurs for all toxic gases, since different toxic substances depend to different degrees on the temperature, and by using amplifier control one can obtain temperature compensation for a specific toxic substance only in the peak situations.

We claim:

1. A filter system for the removal of contaminants from air to be delivered to an automotive vehicle passenger compartment, comprising, in combination with the radiator of the vehicle through which air is displaced by a fan driven by the vehicle engine:

means forming a chemisorption filter receiving contaminated air to be filtered and partially heating said air while filtering same;

heating means downstream of said chemisorption filter for further heating said air;

means containing a catalyst mass traversed by the air heated by said heating means and disposed downstream of said heating means for further purifying the air;

means downstream of said catalyst mass for cooling the air upon passage thereof through said catalyst mass, all of said means collectively forming an air purifier connected to said comparment for supplying said compartment with purified air; and a sensor located behind said radiator and contacted by the air displaced therethrough by said fan for detecting contaminant levels in the external air before it is admitted to said chemisorption filter, for controlling the on/off operation of said air purifier.

2. The filter system defined in claim 1 wherein said sensor is positioned with respect to said radiator and said fan so as to be swept tangentially by the air displaced by said fan.

3. The filter system defined in claim 1, further comprising another sensor responsive to contaminant levels in air admitted to said compartment and located downstream of said air purifier, and a central display connected to said sensors for indicating contaminant levels detected by at least one of said sensors.

4. The filter system defined in claim 1, further comprising control means responsive to said sensor for automatically switching on and off a fan displacing air through said air purifier into said compartment.

5. The filter system defined in claim 1, further comprising control means responsive to said sensor for automatically switching over from the passage of external air into said compartment to the recirculation of air from said compartment to avoid subjecting the compartment to peak levels of contaminants.

6. The filter system defined in claim 1 wherein said sensor is a semiconductor sensor provided in a circuit electrically stabilized for contaminant concentrations of less than 1 ppm.

7. The filter system defined in claim 1 wherein said sensor is provided in a circuit containing a temperature compensating element located directly on said sensor.

8. The filter system defined in claim 1 wherein said temperature compensating element is a heater maintaining said sensor at a constant temperature.

9. The filter system defined in claim 1 wherein said sensor is located in a cowling behind said radiator and ahead of said fan in a forward direction of travel of said vehicle.

10. The filter system defined in claim 9 wherein said sensor is inclined inwardly and rearwardly into said cowling.

11. The filter system defined in claim 3 wherein said other sensor is provided with means for discharging air from said air purifier to the exterior of said vehicle upon detection of a desorption phase of said chemisorption filter.

12. The filter system defined in claim 1, further comprising a resistor connected in parallel to said sensor for linearizing the output thereof.

13. The filter system defined in claim 1, further comprising a PTC resistor with essentially the same temperature coefficient of resistance as said sensor connected in a bridge circuit with said sensor.

14. The filter system defined in claim 13, further comprising an amplifier connected to said bridge circuit, a comparator connected to said amplifier, and an effector circuit connected to said comparator for controlling said air purifier upon the contaminant concentration in said air exceeding a permissible contaminant concentration.

15. The filter system defined in claim 14, further comprising an adjustable voltage divider connected to said comparator for setting a threshold level thereof.

16. The filter system defined in claim 14, further comprising an integrated lowpass filter between said amplifier and said comparator for suppressing signals representing small contaminant peaks.

17. The filter system defined in claim 1, further comprising means for controlled heating of said sensor.

18. The filter system defined in claim 1, further comprising a housing for said sensor, an amplifier connected to said sensor located in said housing, and means for generating a controlled heating voltage for said sensor located in said housing.

19. The filter system defined in claim 18 wherein said housing is perforated in the region of said sensor.

* * * * *